United States Patent Office 2,849,370
Patented Aug. 26, 1958

2,849,370

INJECTABLE INSULIN PREPARATIONS WITH PROTRACTED EFFECT AND PROCESS OF PRODUCING SAME

Karl Petersen and Jorgen Schlichtkrull, Copenhagen, Denmark, assignors to Novo Terapeutisk Laboratorium A/S, Copenhagen, Denmark, a limited liability company of Denmark No Drawing. Application May 28, 1954
Serial No. 433,271

Claims priority, application Denmark June 4, 1953

11 Claims. (Cl. 167—75)

The present invention relates to injectable insulin preparations having a protracted effect and to a process of producing them.

Injectable insulin preparations are known which contain as the active constituent amorphously precipitated zinc protamine insulin in aqueous suspension (pH about 7). Preparations of this kind, which are on the market, contain about 2 mgs. of zinc and either 8.5 or 12.5 mgs. of protamine per 1000 units of insulin. As the amount of protamine necessary for precipitating insulin is generally about 6 to 7 mgs. per 1000 units of insulin it will be seen that these known preparations contain a substantial excess of protamine. This excess has been considered necessary in order to be sure that varying amounts of insulin are not present in a dissolved state because this would result in a variation in the biological effect of the preparations.

Although these preparations, having an effect extending over more than 24 hours, have been extensively used and it has been possible to obtain a useful action in many diabetes cases, the effect has in many cases been found to be more protracted than desired, so that the blood sugar level of the diabetics becomes too high in the day time and too low at night. In such cases attempts have been made to modify the effect of the preparations by adding insulin in the dissolved state. Such addition of insulin has been made industrially so that the ampoules or vials containing the amorphous zinc protamine insulin suspension also contain insulin in the dissolved state, or the dissolved insulin has been put in separate ampoules so that it must be taken up by the injection syringe together with the zinc protamine insulin suspension. The mixing ratio most commonly used has been 2 volumes of dissolved insulin and 1 volume of zinc protamine insulin and in such cases an effect ranging from 18 to 24 hours has been obtained.

The preparations produced by industrial mixing have, however, not shown the necessary chemical and biological stability when stored over a prolonged period of time, and admixing the dissoved insulin with the zinc protamine insulin suspension in the injection syringe has led too easily to errors in dosage when carried out by the patients themselves.

It has been attempted to obtain the desired modified effect by producing suspensions of amorphously precipitated zinc protamine insulin without an excess of protamine, but in this way it has not been possible to obtain preparations which remain stable for a sufficient period of time.

In other words, according to the known art in the insulin field, insulin preparations based on amorphously precipitated insulin can only be used in practice when they contain an excess of protamine, and these preparations have in many cases a too protracted effect.

The present invention is based on the observation that the lack of stability of the hitherto produced suspensions of amorphously precipitated zinc protamine insulin without excess of protamine is due to the buffer used, viz. phosphate buffer, which has a high zinc ion binding power at neutral reaction, and that it is essential for the stability of the suspensions that free zinc ions be present, since these ions suppress the solubility of the insulin at neutral reaction. If the production of the preparations takes place without the presence of substances which, at the reaction conditions, are able to prevent the reaction between the insulin and the zinc, e. g. by forming slightly soluble and/or complex zinc compounds, completely stable preparations will be obtained without employment of an excess of protamine, only if the employed zinc amount is sufficient for suppressing the solubility of the insulin, i. e. above ¼ mg per 1000 international units of insulin.

In the process of the invention protamine, insulin, and a zinc compound, as well as auxiliary substances, if any, such as buffer substances, isotonics, preserving agents and pH-correcting substances, are brought together in an aqueous medium to form a sterile suspension of amorphously precipitated zinc protamine insulin, said suspension having a pH-value of 6 to 8, preferably about 7, and the characteristic feature of the invention lies in the fact that protamine is employed in an amount not exceeding the quantity necessary for precipitating the insulin, preferably 2 to 5 mgs. per 1000 international units of insulin, and auxiliary substances are used which, under the reaction conditions, are not able to form slightly soluble and/or complex zinc compounds which prevent the suppression of the solubility of the insulin at neutral reaction, the amount of zinc employed being above ¼ mg. per 1000 international units of insulin.

According to the invention it is appropriate to use an addition of zinc of 1 to 5 mgs. per 1000 international units of insulin, but considerably larger zinc additions may, however, also be used. Thus, a zinc addition of 20 mgs. or more per 1000 international units of insulin may very well be employed, provided that the added zinc amount is not so great that undesired reactions are obtained, such as pains at the place of injection.

If an addition of buffer substances is used, acetate, barbital, borate and maleate buffers are appropriate buffers. On the other hand, citrate buffer is not appropriate since citrate ions form complex compounds with zinc.

By means of the present invention it not only becomes possible on the basis of amorphously precipitated zinc protamine insulin, to produce preparations with the effect of 18 to 24 hours, which has been sought for so many years, but it also becomes possible to graduate the effect downwardly as desired, by reducing the protamine content of the preparations without affecting the stability of the preparations, since the zinc present will assure the stability. For this reason alone the present invention represents considerable progress because it provides the possibility of obtaining an increased clinical applicability of insulin preparations based on amorphously precipitated zinc protamine insulin, which has been sought for in vain for so long a time.

The process according to the invention can be carried out by mixing the starting materials (amorphous insulin, protamine, zinc compound, distilled water, and, if desired, buffer, isotonic, and a preserving agent) together in any desired order or sequence, and then, if necessary, adjusting the pH-value of the resulting mixture to 6 to 8, preferably about 7. The compounding of the preparation is carried out under aseptic conditions when the starting materials are present in sterile form, for instance as sterile solutions, or when in carrying out the process an unsterile insulin-containing mixture is obtained and the insulin is present in dissolved state, then the mixture is sterilized, for instance by germ filtration, before precipitation of the insulin under aseptic conditions is effected, and any subsequent admixtures are used in sterile form.

As the zinc compound there may be used an inorganic or organic salt, such as the chloride, the sulphate, the nitrate, or the acetate, the hydroxide, or the oxide.

As examples of suitable protamines are salmidrine, clupeine, scombrine, sturine, thymine, cyprinine, and cyclopterine, which are preferably used in the form of aqueous solutions of salts with inorganic or organic acids.

Instead of amorphous insulin, crstalline insulin can be used as starting material, but in this case it is essential that the crystalline insulin be brought into solution in one of the steps of the process.

It is most appropriate to use the insulin in the form of an acid solution of amorphous or crystalline insulin so that the precipitation of the amorphous insulin takes places during the preparation itself, thereby creating the most favorable physical properties for the precipitation.

According to a preferred embodiment of the process, an acid insulin solution is admixed with a solution of the other starting materials, except the buffer substance, whereafter a germ filtration is effected and then, under aseptic conditions, a sterilized solution of the buffer substance is added together with pH-regulating substances, if any, in order to obtain a pH-value between 6 and 8, preferably about 7.

Amorphous insulin is able to combine with varying amounts of zinc. Consequently, it is also possible when carrying out the process according to the invention to use amorphous insulin with such a zinc content that the zinc content of the final suspension entirely or partly is derived from the amorphous insulin employed.

Instead of amorphous insulin having a zinc content such that the zinc content of the final suspension entirely or partly is derived from the amorphous insulin employed, crystalline insulin with a corresponding zinc content may be used, but in such case the crystalline insulin must be present in the dissolved state or be brought into solution during the preparation for subsequent precipitation in the amorphous state.

In order to produce isotonicity, substances, such as glucose, sodium chloride, and glycerol may be used. Examples of appropriate preserving agents are methyl-p-oxybenzoate, propyl-p-oxybenzoate and phenyl mercuric acetate.

In order to further illustrate the process according to the invention reference is made to the following examples showing various embodiments to which, however, the invention is not limited.

For carrying out the invention the following sterile stock solutions may be used:

STOCK SOLUTION 1

2.2 grams of re-crystallized insulin are dissolved in 25 milliliters of 0.1 N hydrochloric acid, and distilled water is added to obtain a volume of 125 milliliters.

STOCK SOLUTION 2

500 mgs. of protamine sulphate are dissolved in water to a volume of 100 milliliters.

STOCK SOLUTION 3

100 mgs. of surfen hydrochloride are dissolved in water to a volume of 100 milliliters.

STOCK SOLUTION 4

To 20 milliliters of an aqueous solution of zinc chloride containing 1% of Zn, distilled water is added to obtain a volume of 125 milliliters.

STOCK SOLUTION 5

To 10 milliliters of an aqueous nickel chloride solution containing 1% of Ni, distilled water is added to obtain a volume of 100 milliliters.

STOCK SOLUTION 6

1.36 grams of sodium acetate with 3 moles of crystal water are dissolved in distilled water to obtain a volume of 100 milliliters.

STOCK SOLUTION 7

1.16 grams of maleic acid are dissolved in distilled water to obtain a volume of 100 milliliters.

STOCK SOLUTION 8

2.06 grams of sodium barbital are dissolved in distilled water to obtain a volume of 100 milliliters.

STOCK SOLUTION 9

0.95 gram of borax is dissolved in distilled water to obtain a volume of 100 milliliters.

Example 1

1.3 milliliters of glycerol are mixed with 0.5 milliliter of a 25% solution of methyl-p-oxybenzoate in ethanol, and distilled water in an amount of 50 milliliters is added. To the mixture thus obtained are added, after sterile filtration, 10 milliliters of stock solution (1), 1 milliliter of stock solution (2), 2.5 milliliters of stock solution (4) and 10 milliliters of stock solution (6), whereafter 3.0 milliliters of sterile 0.1 N NaOH are added and sterile distilled water is added to a volume of 100 milliliters.

By the addition of NaOH the zinc protamine insulin is precipitated amorphously, and the suspension obtained will show a pH-value of 7. It contains about 1 mg. of zinc and 1.25 mgs. of protamine per 1000 international units of insulin.

Example 2

The procedure in Example 1 is repeated, but double the amounts of stock solutions (2) and (1) are used with the result that the suspension produced will contain about 2 mgs. of zinc and 2½ mgs. of protamine per 1000 international units of insulin.

Example 3

The procedure of Example 2 is repeated, but double the amount (4 milliliters) of stock solution (2) is employed, with the result that the final suspension will contain about 2 mgs. of zinc and 5 mgs. of protamine per 1000 international units of insulin.

Example 4

The procedure of Example 3 is repeated, except that 10 milliliters of stock solution (5) instead of 5 milliliters of stock solution (4) are employed. The final suspension will then contain 2.5 mgs. of nickel and 5 mgs. of protamine per 1000 international units of insulin.

Example 5

The procedure of Example 3 is followed, except that 20 milliliters instead of 5 milliliters of stock solution (4) are employed. The final suspension will then contain 8 mgs. of zinc and 5 mgs. of protamine per 1000 international units of insulin.

Example 6

The procedure of Example 3 is followed, except that 6 milliliters of stock solution (2) are emloyed. The final suspension will then contain 2 mgs. of zinc and 7.5 mgs. of protamine per 1000 international units of insulin.

Example 7

The procedure of Example 6 is repeated, except that 20 milliliters of stock solution (3) instead of 6 milliliters of stock solution (2) are employed. The final suspension will then contain about 2 mgs. of zinc and 5 mgs. of surfen per 1000 international units of insulin.

*Example 8*

1.3 milliliters of glycerol are mixed with 0.5 milliliter of a 25% solution of methyl-p-oxybenzoate in ethanol, and 50 milliliters of distilled water are added. To the mixture thus obtained are added, after sterile filtration, 10 milliliters of stock solution (1), 5 milliliters of stock solution (4), 4 milliliters of stock solution (2), and 10 milliliters of stock solution (7), whereupon 21.5 milliliters of sterile 0.1 N NaOH are added, and the mixture is diluted with water to a volume of 100 milliliters. The suspension of amorphous zinc protamine insulin obtained has a pH-value of 7 and contains about 2 mgs. of zinc and 5 mgs. of protamine per 1000 international units of insulin.

*Example 9*

The procedure of Example 8 is followed, except that 10 milliliters of stock solution (8), are used instead of 10 milliliters of stock solution (7), and 4.5 milliliters of 0.1 N sterile HCl are used instead of 21.4 milliliters of 0.1 N NaOH. The suspension obtained will contain 2 mgs. of zinc and 5 mgs. of protamine per 1000 international units of insulin.

*Example 10*

The procedure of Example 9 is repeated, except that 10 milliliters of stock solution (9) are employed instead of 10 milliliters of stock solution (8), and 0.9 milliliter of sterile 0.1 N. HCl is used instead of 4.5 milliliters.

The principle of the present invention of effective stabilization of the insulin preparations and suppression of the solubility of the insulin at neutral reaction by means of zinc may also be used in connection with insulin preparations in the production of which protamine has been substituted by substances having an effect similar to that of protamine. Hence, it is within the scope of the invention to use substances such as histone, surfen (bis-2-methyl-4-aminochinolyl-6-carbamide) or rivanol (2-aethoxy-6.9-diamino-acridine) instead of or together with protamine.

Finally it is to be noted that according to the invention a compound of cadmium, or cobalt, nickel, copper, manganese or iron in divalent form or a mixture of such compounds may be used instead of or together with the zinc compound.

Having thus fully described our invention we claim as new and desire to secure by Letters Patent:

1. An injectable insulin preparation with protracted effect, comprising a sterile suspension of amorphous zinc protamine insulin in an aqueous suspension medium having a pH-value between 6 and 8, said suspension containing protamine in an amount of at least one mg. per 1000 international units of insulin but not exceeding the amount necessary for substantially complete precipitation of the insulin, and zinc in an amount between ¼ and 20 mgs. per 1000 international units of insulin, said suspension being also free from phosphate and citrate ions in amounts preventing the suppression by the zinc of the solubility of the insulin at pH 7.

2. The insulin preparation of claim 1, in which the aqueous suspension medium has a pH-value about 7.

3. The insulin preparation of claim 1 containing the protamine in an amount of 2 to 5 mgs. per 1000 international units of insulin.

4. The insulin preparation of claim 1 containing zinc in an amount of 1 to 5 mgs. per 1000 international units of insulin.

5. The insulin preparation of claim 1 containing zinc in an amount of 1 to 2 mgs. per 1000 international units of insulin.

6. A process of producing injectable insulin preparations with protracted effect, which comprises bringing protamine, insulin, and a zinc compound together in an aqueous medium to form a sterile suspension of amorphously precipitated zinc protamine insulin having a pH-value of 6 to 8, the protamine being employed in an amount of at least one mg. per 1000 international units of insulin but not exceeding the amount necessary for substantially complete precipitation of the insulin, the zinc compound being used in an amount such that the final suspension contains between ¼ and 20 mgs. per 1000 international units of insulin, substances being avoided, which, under the employed reaction conditions, are able to form slightly soluble zinc compounds and complex zinc compounds preventing the suppression by the zinc of the solubility of the insulin at pH 7.

7. The process of claim 6, in which the amount of protamine used is 1 to 5 mgs. per 1000 international units of insulin.

8. The process of claim 6, in which the amount of zinc employed is 1 to 5 mgs. per 1000 international units of insulin.

9. The process of claim 6, in which the amount of zinc employed is 1 to 2 mgs. per 1000 international units of insulin.

10. The process of claim 6, in which the aqueous suspension of the amorphous zinc protamine insulin is adjusted to a pH-value about 7.

11. A process of producing injectable insulin preparations with protracted effect, which comprises bringing protamine and insulin together in an aqueous medium to form a sterile suspension of amorphously precipitated protamine insulin having a pH-value of 6–8, the protamine being employed in an amount of at least one mg. per 1000 international units of insulin but not exceeding the amount necessary for substantially complete precipitation of the insulin, the insulin used containing sufficient zinc to give the final suspension a non-toxic zinc content of between ¼ and 20 mgs. per 1000 international units of insulin, substances being avoided, which, under the employed reaction conditions, are able to form slightly soluble zinc compounds and complex zinc compounds preventing the suppression by the zinc of the solubility of the insulin at pH 7.

References Cited in the file of this patent

UNITED STATES PATENTS

| | | |
|---|---|---|
| 2,232,641 | Scott et al. | Feb. 18, 1941 |
| 2,538,018 | Krayenbuhl | Aug. 4, 1947 |

OTHER REFERENCES

Lawrence et al.: Brit. Med. J., Jan. 31, 1953, 1:242–244.

Hallas-Moller et al.: Sci., 116–3015, 394–397, Oct. 10, 1952.

Hallas-Moller et al.: J. A. M. A., 150:17, 1667–1671, Dec. 27, 1952.

Sahyun: Am. J. of Physiology, 125:1, pp. 24–30, January 1939.

Cohn et al.: J. Am. Chem. Soc. 63, pp. 17–21, January 1941.

Romans et al.: Ind. and Eng. Chem. 32:7, pp. 908–910, July 1940.